No. 632,849. Patented Sept. 12, 1899.
E. M. PUTNAM & W. SELLERS.
TROLLEY WHEEL.
(Application filed Mar. 25, 1899.)
(No Model.)
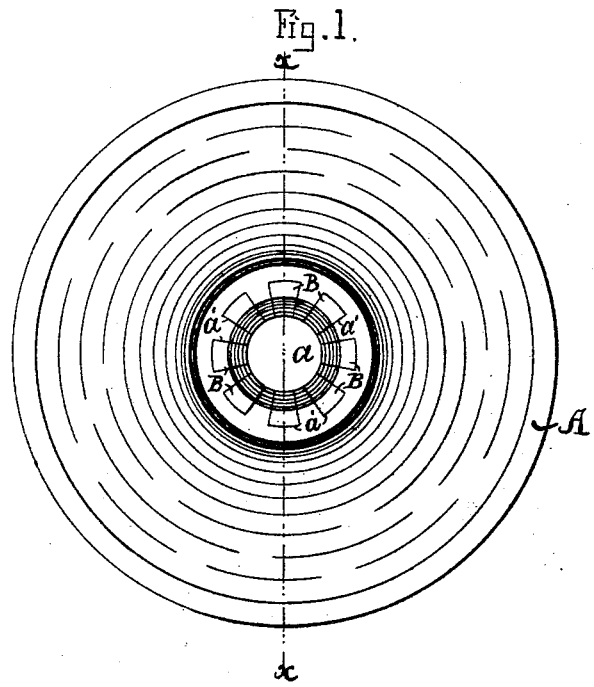
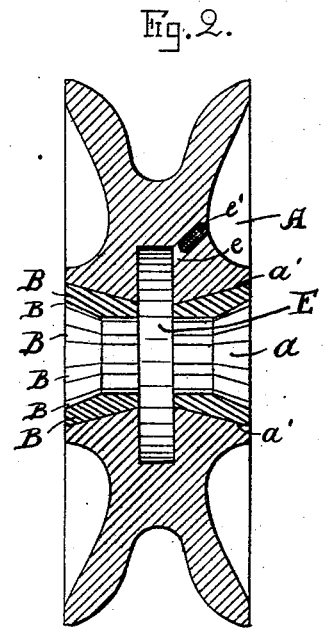
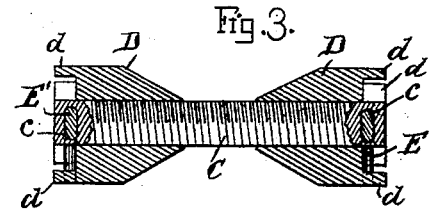
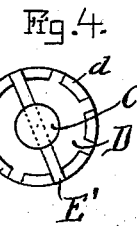
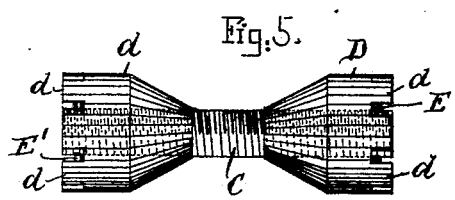
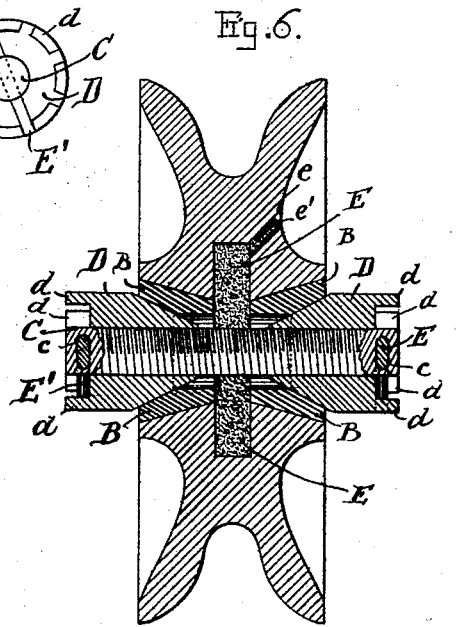
Witnesses.
Lauritz N. Möller
Edward E. Brown
Inventors.
Ed. M. Putnam
William Sellers
by Edwin Planta
attorney

UNITED STATES PATENT OFFICE.

ED M. PUTNAM AND WILLIAM SELLERS, OF HAVERHILL, MASSACHUSETTS.

TROLLEY-WHEEL.

SPECIFICATION forming part of Letters Patent No. 632,849, dated September 12, 1899.

Application filed March 25, 1899. Serial No. 710,485. (No model.)

*To all whom it may concern:*

Be it known that we, ED M. PUTNAM and WILLIAM SELLERS, citizens of the United States, and residents of Haverhill, in the county of Essex and State of Massachusetts, have invented certain new and useful Improvements in Trolley-Wheels, of which the following is a specification.

Trolley-wheels for making contact between an overhead wire and an electric car are usually mounted upon a straight bolt carried by the fork, and the friction of the hub of the wheel upon the sides of the fork causes the wheel to soon work loose. In order to prevent the friction coming upon the sides of the fork, washers have been introduced, but with very little satisfaction.

The object of our invention is to overcome this difficulty and to so construct and mount a wheel in the fork that it will run steady, but should any wear take place can be readily and easily adjusted, and which will not be required to be lubricated.

The invention consists of a trolley-wheel having a central hole countersunk at each end and formed with a series of dovetailed recesses, into which graphite or other suitable lubricating material is inserted, also an annular recess in the center of the wheel, in which powdered or other suitable lubricating material is placed, and also in an axle consisting of a screw-threaded rod that passes through the hole in the wheel and upon which is secured bearings cone-shaped at their inner ends to fit bevel at the sides of the wheel, and also in means for retaining said bearings in place.

Referring to the accompanying drawings, Figure 1 represents a side view of a trolley-wheel embodying our invention. Fig. 2 is a sectional view of same, taken on line $x\ x$ of Fig. 1. Fig. 3 is a longitudinal section of the axle for said wheel. Fig. 4 is an end view of the same. Fig. 5 is a side view, and Fig. 6 is a section of the wheel and the axle.

A represents a trolley-wheel the general formation of which is the same as that of the ordinary wheel; but the central hole $a$ is at each side countersunk, as shown, and it is also formed with a number of dovetailed recesses $a'$, into each of which is placed graphite B, that is securely held in place by the dovetailed form of said recesses. The wheel is also formed in its central portion with an annular recess E, in which lubricating material is placed, said material being introduced through an opening $e$, and when filled said opening is closed by a plug $e'$. This wheel is mounted upon an axle consisting of a screw-threaded rod C, having near each end a small hole $c$, and upon each end of the rod is fitted a bearing D, cone-shaped at its inner end and corresponding to the bevel of the countersunk ends of the hole in the wheel. The outer end of each of these bearings is recessed and formed with a series of projections or teeth $d$, so that when the bearing is screwed up or adjusted to its proper position a pin E' can be placed through the space between the teeth $d$ and through the hole $c$ in the rod C, whereby said bearing will be prevented from turning. The outer ends of the bearing D are carried in the fork in the usual manner.

Should the wheel at any time work loose, it can be readily and easily tightened up by removing one or both the pins E and turning the bearings D until they fit snugly into the wheel, and the graphite lubricating same will cause the wheel to run very easily.

Although we have shown a pin E passing through a hole in the screw-threaded rod and between teeth on the outer end of the bearing, it is obvious that any other mechanical equivalent might be employed to prevent the bearing from turning upon said rod.

What we claim is—

1. The combination with a trolley-wheel having a central hole countersunk at each end and a series of dovetailed recesses therein and containing a suitable lubricating material, of an axle for said wheel consisting of a screw-threaded rod, and cone-shaped bearings threaded to fit the ends of said rod, whereby the two bearings may be adjustably set relatively to the dovetailed recesses in the wheel, and means for locking the bearings in their positions relatively to the threaded rod, a space being formed between the central portion of the threaded rod and the central portion of the hole in the wheel.

2. The combination with a trolley-wheel having a central hole countersunk at each end and a series of dovetailed recesses therein and containing a suitable lubricating material, and a central inner recess in said wheel for containing lubricating material, of an axle for said wheel consisting of a screw-threaded rod, and cone-shaped bearings threaded to fit the ends of said rod, whereby the two bearings may be adjustably set relatively to the dovetailed recesses in the wheel, and means for locking the bearings in their positions relatively to the threaded rod, a space being formed between the central portion of the threaded rod and the central portion of the hole in the wheel.

In testimony whereof we have affixed our signatures in presence of two witnesses.

ED M. PUTNAM.
WILLIAM SELLERS.

Witnesses:
CHAS. STEERE,
EDWIN PLANTA.